United States Patent
Eburderie

(10) Patent No.: US 11,512,650 B2
(45) Date of Patent: Nov. 29, 2022

(54) METHOD AND DEVICE FOR DETECTING CONDITIONS CONDUCIVE TO THE ONSET OF PUMPING WITH A VIEW TO PROTECTING A COMPRESSOR OF AN AIRCRAFT TURBINE ENGINE

(71) Applicant: SAFRAN AIRCRAFT ENGINES, Paris (FR)

(72) Inventor: Emmanuel Mickaël Eburderie, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 597 days.

(21) Appl. No.: 16/491,127

(22) PCT Filed: Mar. 6, 2018

(86) PCT No.: PCT/FR2018/050515
§ 371 (c)(1),
(2) Date: Sep. 4, 2019

(87) PCT Pub. No.: WO2018/162841
PCT Pub. Date: Sep. 13, 2018

(65) Prior Publication Data
US 2020/0010211 A1    Jan. 9, 2020

(30) Foreign Application Priority Data

Mar. 7, 2017 (FR) ...................................... 1751842

(51) Int. Cl.
*F02C 9/18* (2006.01)
*B64F 5/60* (2017.01)
*B64D 45/00* (2006.01)

(52) U.S. Cl.
CPC ................. *F02C 9/18* (2013.01); *B64F 5/60* (2017.01); *B64D 2045/0085* (2013.01); *F05D 2270/114* (2013.01); *F05D 2270/304* (2013.01)

(58) Field of Classification Search
CPC ...... F02C 9/16; F02C 9/18; F02C 9/20; F02C 9/50; F02C 9/52; F02C 9/54; B64D 43/02;

(Continued)

(56) References Cited

U.S. PATENT DOCUMENTS 3,677,000 A  *  7/1972 Thomson ................ F04D 27/02
                                                                415/195
4,083,235 A     4/1978 Gallant
(Continued)

FOREIGN PATENT DOCUMENTS

FR    2 332 428 A1    6/1977
FR    2 962 500 A1    1/2012

OTHER PUBLICATIONS

International Search Report dated Jun. 12, 2018, issued in corresponding International Application No. PCT/FR2018/050515, filed Mar. 6, 2018, 4 pages.

(Continued)

*Primary Examiner* — Alain Chau
(74) *Attorney, Agent, or Firm* — Christensen O'Connor Johnson Kindness PLLC

(57) ABSTRACT

A method and device for detecting conditions conducive to the onset of pumping that can affect a low-pressure compressor of an aircraft turbine engine. The turbine engine including a high-pressure compressor. The method including measuring a speed variation of the aircraft and measuring a speed variation of the high-pressure compressor. The method including a preliminary step of measuring an altitude of the aircraft. The conditions conducive to the onset of pumping being detected when the following conditions are jointly obtained: (a) the speed variation measured over a predetermined time interval corresponds to an acceleration greater than a first positive threshold, (b) the measured speed variation corresponds to a deceleration less than a second negative threshold, and (c) the altitude is greater than a third predetermined threshold.

22 Claims, 6 Drawing Sheets

(58) Field of Classification Search
CPC ............... B64D 2045/0085; B64F 5/60; F05D 2270/101
See application file for complete search history.

(56) References Cited

U.S. PATENT DOCUMENTS

| | | | | | |
|---|---|---|---|---|---|
| 4,502,275 | A | * | 3/1985 | Petro | F02C 9/50 60/39.27 |
| 4,627,789 | A | * | 12/1986 | Petro | F02C 9/18 415/28 |
| 4,756,152 | A | * | 7/1988 | Krukoski | F02C 9/28 60/773 |
| 4,991,389 | A | * | 2/1991 | Schafer | F04D 27/0223 60/39.24 |
| 5,313,778 | A | * | 5/1994 | Sweet | F02C 9/18 60/772 |
| 2002/0170295 | A1 | * | 11/2002 | Chapman | F04D 27/0223 60/785 |
| 2018/0340474 | A1 | * | 11/2018 | Baladi | F02C 9/18 |

OTHER PUBLICATIONS

Written Opinion dated Jun. 12, 2018, issued in corresponding International Application No. PCT/FR2018/050515, filed Mar. 6, 2018, 5 pages.

* cited by examiner

METHOD AND DEVICE FOR DETECTING CONDITIONS CONDUCIVE TO THE ONSET OF PUMPING WITH A VIEW TO PROTECTING A COMPRESSOR OF AN AIRCRAFT TURBINE ENGINE

BACKGROUND OF THE INVENTION

The present invention relates to the general field of aircraft turbine engines. In particular, the present invention relates to the detection of pumping conditions that can affect a compressor of an aircraft turbine engine, in particular a low-pressure compressor of a twin bypass turbine engine. In the present patent application, pumping conditions means conditions conducive to the onset of a pumping.

By definition, a pumping is an aerodynamic instability of the flow of fluid through a compressor of a turbine engine, which can be accompanied by a flow reversal. For example, if the compressor tries to compress more gas than the turbine downstream can deliver, pulsed backflows of hot gases towards the front can occur, i.e. in the upstream direction of the flow of gases, with stalling of the flow on the blades of the compressor.

A pumping can thus lead to damage to parts that constitute a turbine engine. This damage comprises the breaking of the blades of the compressor, the destruction of bearings, or the extinction of the turbine engine. The importance of being able to reliably and precisely detect the conditions conducive to the onset of a pumping in a compressor of a turbine engine in order to prevent it is therefore understood. The onset of a pumping can indeed cause operational consequences that can involve substantial financial costs.

Means are known for preserving the integrity and the performance of a compressor under certain conditions conducive to a pumping. In particular, methods and devices are known for detecting a risk of pumping in a compressor when the operating line of said compressor becomes less than a predetermined threshold, referred to as pumping line. It is also known from the publication of U.S. Pat. No. 4,756,152A a method for regulating the control of the bleed valves of a compressor, in particular during a deceleration of the turbine engine, in order to recover pumping margin.

A blocking detector and a method for detecting blocking in a gas turbine engine are also known from patent publication FR 2 332 428 A1.

Certain low-pressure compressors for aircraft turbine engines, also called "boosters", have a pumping margin that is relatively low at high altitude. In other terms, the operating line of the compressor in stability at high altitude is close to the pumping line. A low-pressure compressor of a twin bypass turbine engine can therefore have increased sensitivity to pumping above a certain high altitude. This requires good control of the management of the protections against pumping of the compressor with regards to the transient phases that the turbine engine may encounter.

Furthermore, the known detection methods and devices do not allow detecting conditions conducive to the onset of a pumping in certain flight situations. An example of a problematic flight situation is that of an aircraft flying in so-called "auto-throttle" mode. When an aircraft undergoes a sudden increase in the headwind, the speed seen by the aircraft, which is measured with respect to the relative wind, consequently increases. In what follows, the speed of the aircraft will mean the speed seen by the aircraft, measured for example using a Pitot tube anemometer. In auto-throttle mode and in most of the cruise phase of the aircraft, the power of the turbine engine is adjusted such that the speed of the aircraft remains constant. Thus, during an increase in the headwind, the auto-throttle mode reacts so as to decrease the absolute speed of the aircraft, such that the speed seen by the aircraft remains constant. For this, for certain categories of engines and according to the control logic adopted by the engine manufacturer, the auto-throttle mode controls the reduction in the operating speed of the low-pressure compressor (also called speed N1) of the turbine engine, in order to reduce the speed of the fan of the turbine engine and therefore the thrust thereof. This can be problematic for detecting pumping conditions, since the speed variations of the turbine engine are limited by the auto-throttle mode, which prevents the usual means for detecting pumping conditions from operating.

There are therefore certain conditions conducive to the onset of a pumping, in particular conditions that can arise in the framework of a cruise flight in altitude, which cannot be detected by the known detection methods of the prior art.

AIM AND SUMMARY OF THE INVENTION

An aim of the invention is to propose a method of detecting conditions conducive to the onset of a pumping, to protect a low-pressure compressor of a twin bypass turbine engine in particular in the framework of a cruise flight in altitude.

Correlatively, another aim of the invention is to propose a device for controlling the opening and the closing of bleed valves of a twin bypass turbine engine in case of detection of conditions conducive to the onset of a pumping of a low-pressure compressor of said turbine engine.

Correlatively, another aim of the invention is to propose a twin bypass turbine engine of which a low-pressure compressor is protected in the case of detection of conditions conducive to the onset of a pumping.

In the present description and the appended claims, the expression "greater than" is used to designate a quantity of which the value is greater than or equal to another value, while the expression "less than" is used to designate a quantity of which the value is smaller than or equal to another value. Furthermore, the calculation of a difference between a first quantity, for example a quantity measured at a first time, and a second quantity, for example a quantity measured at a second time, designates the subtraction of this second quantity by this first quantity.

It is also understood that a speed can be expressed in metres per second or as a Mach number. The Mach number of an aircraft is obtained by dividing the speed of this aircraft by the speed of sound, with the speed of sound being equal to 340 m/s in air at a temperature of 15° C.

A first aspect of the invention thus relates to a method for detecting conditions conducive to the onset of a pumping that can affect a low-pressure compressor of an aircraft turbine engine, said turbine engine further comprising a high-pressure compressor, said method being characterised in that it comprises:
  a first step of measuring a speed variation of said aircraft;
  a second step of measuring a speed variation of said high-pressure compressor;
  a preliminary step of measuring an altitude of the aircraft;
  the conditions conducive to the onset of a pumping being detected when the following conditions a), b) and c) are jointly obtained:
  a) said speed variation measured over a predetermined time interval corresponds to an acceleration greater than a first positive threshold, with said first threshold being for example equal to 0.001 Mach per second, said time interval being for example equal to 10 seconds, b) said measured speed variation corresponds to a deceleration less than a second negative threshold, said second threshold being for example equal to −8 revolutions per minute per second, and c) said measured altitude is greater than a third predetermined threshold, with said third threshold being for example equal to 25,000 feet (7,620 metres).

Advantageously, this method allows detecting conditions conducive to the onset of a pumping in a reliable manner without affecting the operating parameters of the turbine engine.

Advantageously, this method allows preventing the erroneous detection of conditions conducive to the onset of a pumping that occur due to phenomena that produce effects that are similar to those of a variation in the operating speed of a compressor of the turbine engine, for example a decrease in this speed caused by a malfunction, by the absorption of ice or of a foreign body, or by the onset of another unstable phenomena such as a rotating stall.

Advantageously, this method allows reliably detecting the onset of a pumping when the aircraft is flying at a high altitude.

In a particular embodiment of the invention, the method for detecting further comprises:

a fourth step of measuring a first controlled speed of the low-pressure compressor;

a fifth step of measuring a second current speed of the low-pressure compressor;

with the conditions conducive to the onset of a pumping being detected, independently of the fulfilling of the conditions a), b) and c), when the following condition d) is fulfilled:

d) the difference between said first measured controlled speed and said second measured current speed is less than a fourth threshold, with said fourth threshold being for example equal to −100 revolutions per minute.

Advantageously, this method allows detecting conditions conducive to the onset of a pumping when the aircraft is flying in auto-throttle mode.

In a particular embodiment of the invention, if the measured altitude is less than the third threshold, the first and second steps of measuring are ignored and the conditions conducive to the onset of a pumping are detected when the condition d) is fulfilled.

In a particular embodiment of the invention, the detecting of conditions conducive to the onset of a pumping triggers a command to open bleed valves located between the low-pressure compressor and the high-pressure compressor.

In a particular embodiment of the invention, said speed variation is measured by calculating the derivative of the speed then by filtering it with a time constant adapted to average the measurement over a time interval between 1 second and 3 seconds.

Another aspect of the invention further relates to a device for detecting conditions conducive to the onset of a pumping that can affect a low-pressure compressor of an aircraft turbine engine, said turbine engine further comprising a high-pressure compressor, said device being characterised in that it comprises:

first means for measuring a speed variation of said aircraft;

second means for measuring a speed variation of said high-pressure compressor;

third means for measuring an altitude of the aircraft;

with the device further comprising means for detecting an acceleration of the aircraft, said detection means comprising:

means for activating a first indicator that represents a speed variation;

means for activating a second indicator that represents a speed variation of the high-pressure compressor;

means for activating a third indicator;

means for activating an indicator of the risk of pumping that represents the detection of conditions conducive to the onset of a pumping;

said indicator of the risk of pumping being activated when the first indicator, the second indicator and the third indicator are activated simultaneously;

the first indicator being activated when the speed variation measured over a predetermined time interval corresponds to an acceleration greater than a first threshold, with said first threshold being for example equal to 0.001 Mach per second;

the second indicator being activated when the measured speed variation corresponds to a deceleration less than a second threshold, with said second threshold being for example equal to −8 revolutions per minute per second; and the third indicator being activated when the measured altitude is greater than a predetermined third threshold, said third threshold being for example equal to 25,000 feet (7,620 metres).

Advantageously, this device allows detecting conditions conducive to the onset of a pumping from the use of means that are conventionally used during the monitoring of the flight phases of an aircraft, which makes it simple to implement.

In a particular embodiment of the invention, the detection device further comprises:

fourth means for measuring a first controlled speed of the low-pressure compressor;

fifth means for measuring a second current speed of the low-pressure compressor;

with the means for detecting an acceleration of the aircraft further comprising means for activating a fourth indicator, the indicator being activated when the first indicator, the second indicator and the third indicator are not activated simultaneously and when said fourth indicator is activated, said fourth indicator being activated when the difference between said first measured controlled speed and said second measured current speed is less than a fourth threshold, with said fourth threshold being for example equal to −100 revolutions per minute.

Another aspect of the invention relates to a turbine engine comprising a detection device according to the invention.

In the present description and the appended claims, it is considered that any magnitude of a predetermined value is within an interval that comprises this value, with the limits of this interval able to be moved several orders of magnitude away from this value.

Thus, the first threshold is comprised between $10^{-4}$ Mach per second and $10^{-2}$ Mach per second, with this first threshold being for example equal to 0.001 Mach per second.

The time interval is comprised between 3 seconds and 20 seconds, with this time interval being for example equal to 10 seconds.

The second threshold is comprised between −2 revolutions per minute per second and −20 revolutions per minute per second, with this second threshold being for example equal to −8 revolutions per minute per second.

The third threshold is comprised between 20,000 feet (6,096 metres) and 30,000 feet (9,144 metres), with this third threshold being for example equal to 25,000 feet (7,620 metres).

BRIEF DESCRIPTION OF THE DRAWINGS

The invention and the technical features thereof will be better understood upon reading the following description, accompanied by several figures representing respectively.

Naturally, to satisfy specific needs, a skilled person in the field of the art can make modifications to the following description. Although it refers to different embodiments, the present invention is not limited to these specific embodiments, and all of the modifications specific to the scope of application of the present invention can be considered as obvious for a person skilled in the corresponding art.

DETAILED DESCRIPTION OF AN EMBODIMENT

The invention thus proposes, to detect certain conditions conducive to the onset of a pumping that can affect a low-pressure compressor of an aircraft turbine engine, to monitor on the one hand the accelerations of this aircraft via the detecting of a variation in the speed thereof, and to monitor on the other hand the decreases in speed of a high-pressure compressor of the same turbine engine. As mentioned above, an acceleration of the aircraft is an increase in the speed seen by the aircraft, and can therefore be caused by an increase of the headwind.

In addition, the invention proposes to improve this detection in certain flight situations by monitoring the altitude of the aircraft, in order to detect in particular pumping conditions that are specific to a flight above a certain altitude threshold. Furthermore, a monitoring of the operating speed of the low-pressure compressor with regards to the controlled speed can also be implemented by the invention, in order, in particular, to detect pumping conditions below the abovementioned altitude threshold.

In other words, the invention proposes to raise and to combine several indicators relative to the performance of the turbine engine and of the aircraft transporting this turbine engine, in order to reliably and selectively identify conditions conducive to the onset of a pumping, In the scope of the present invention, it is understood that an aircraft flies according to a given flight phase. A flight phase of an aircraft is, for example, a take-off phase, a climb phase, a descent phase, a landing phase, or a cruise phase of flight.

In particular, it is understood that the present invention is applicable to an aircraft flying according to a cruise phase of flight at high altitude, during which the piloting of the aircraft is carried out in auto-throttle mode.

Figure 1:
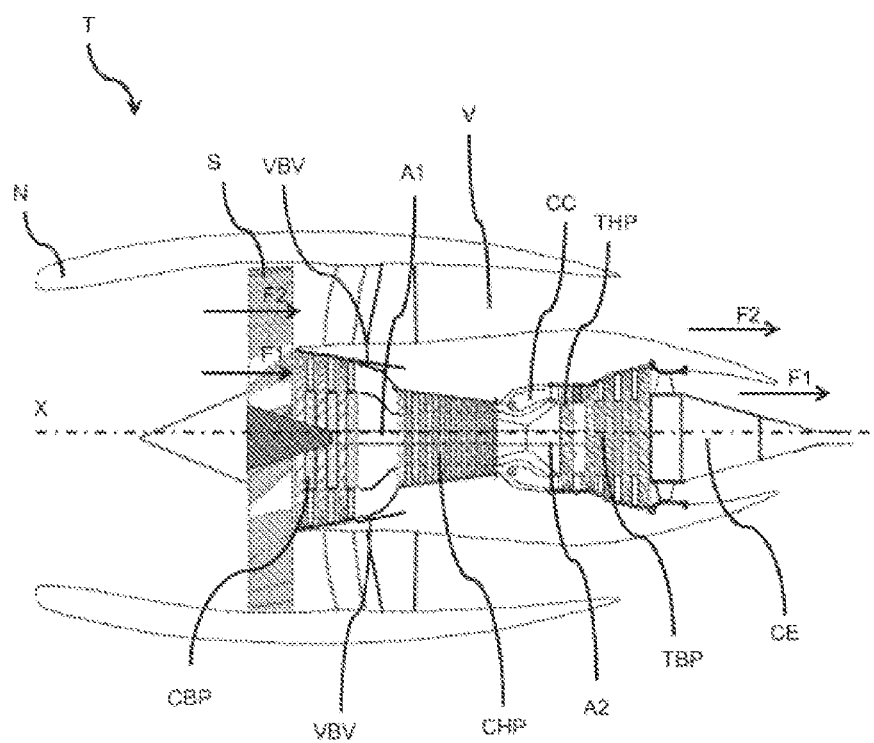
FIG. 1 represents, as a cross-section, a turbine engine on which the invention can be applied.

FIG. 1 represents a cross-sectional view of a turbine engine on which the invention can be applied. The turbine engine is here a twin bypass turbine engine T, mounted on an aircraft.

In general and unless mentioned otherwise, only the front and the rear of the turbine engine T will be defined here, as well as the inlet and the outlet of said turbine engine T, are defined relatively in terms of the flow of the fluids within the latter. Consequently, the front and the rear of the turbine engine are located to the upstream and to the downstream of the flow of fluids.

The turbine engine T comprises a nacelle N. The nacelle N surrounds all of the components of the turbine engine T, and comprises for example a fairing to protect these components from the outside. The nacelle N has an external structure that defines with an internal structure one or more ducts V. This or these ducts V allow a flow of a fluid, for example a flow of air, inside the nacelle N of the turbine engine T.

The turbine engine T comprises a fan S mounted at the front of the nacelle N. The fan S is for example a rotor comprised of vanes and/or of blades, which are driven by the turbine of the turbine engine T.

The fan S has the function of receiving all of the fluid that penetrates at the front of the turbine engine T, and to redirect this fluid into all of the ducts V of the nacelle N. The fluid received by the fan S is divided into a primary flow F1 and a secondary flow F2, respectively.

The primary flow F1 passes through an inlet compressor, referred to as low-pressure compressor CBP, formed inside the turbine engine T and integral with the fan S. The role of the low-pressure compressor CBP is to increase the pressure of the fluid passing through it.

A turboshaft T according to an embodiment of the invention further comprises a high-pressure compressor CBP, a combustion chamber CC, a high-pressure turbine THP and a low-pressure turbine TBP. As illustrated, it is understood that the high-pressure compressor CHP is arranged at the rear of the low-pressure compressor CBP. The high-pressure turbine THP is arranged at the rear of the high-pressure compressor CHP and of the combustion chamber CC, and the low-pressure turbine TBP is arranged at the rear of the high-pressure turbine THP.

The low-pressure compressor CBP is mechanically coupled to the low-pressure turbine TBP by a first shaft A1, while the high-pressure compressor CHP is mechanically coupled to the high-pressure turbine THP by a second shaft A2 coaxially passed through by the first shaft A1.

The high-pressure compressor CHP has the function of receiving and compressing the gases coming from the low-pressure compressor CBP.

The low-pressure compressor CBP and the low-pressure turbine TBP rotate at the same speed of rotation, while the high-pressure compressor CHP and the high-pressure turbine THP rotate at another speed of rotation.

As illustrated, the twin bypass turbine engine T comprises on the one hand a low-pressure body including the low-pressure compressor CBP, the low-pressure turbine TBP and the first shaft A1, and on the other hand a high-pressure body including the high-pressure compressor CHP, the high-pressure turbine THP and the second shaft A2. This low-pressure body and this high-pressure body form two units that mechanically rotate independently from one another.

When the turbine engine T is in operation, the primary flow F1 first passes through the low-pressure compressor CBP integral with the fan S, then the high-pressure compressor CHP. The high-pressure compressor CHP channels the compressed fluid to the combustion chamber CC, wherein the fluid from the primary flow F1 is mixed with a fuel under pressure. The fluid-fuel mixture is then burnt, and the outgoing flow from the combustion chamber CC drives the high-pressure turbine THP. According to whether more or less fuel is injected into the combustion chamber CC, the high-pressure turbine THP is subjected to variations in the speed of rotation.

It is understood that the combustion chamber CC is arranged, in the direction of the flow of the fluids, between the high-pressure compressor CHP and the high-pressure turbine THP.

The primary flow F1 is finally ejected at high speed outside the nacelle N towards the rear of the turbine engine T by flowing along the ejection cone CE. The ejection of the primary flow F1 at high speed allows generating a portion of the thrust useful for the propulsion of an aircraft.

According to an embodiment of the invention not represented in the figures, the turbine engine T can also comprise adjusting means to adjust the speed of rotation of the low-pressure turbine TBP to a substantially constant speed.

When the turbine engine T is in operation, the fan S is driven in rotation by the passage of the secondary flow F2, that mixes the latter by directing it towards the rear of the turbine engine T. The vanes and/or the blades of the fan S will interact with the absorbed fluid and will increase the speed thereof. The secondary flow F2, flows into the duct or ducts V formed inside the nacelle N. The ejection of the fluid corresponding to the secondary flow F2 towards the rear of the turbine engine T represents most of the thrust useful for the propulsion of the aircraft.

By design, a turbine engine is provided to operate within stipulated limits. The compressors of a turbine engine are designed to operate with a margin that is sufficient, referred to as pumping margin, such that the turbine engine can operate without pumping within the range of use thereof. It is understood that the acceleration or deceleration capacity of a turbine engine is limited by this pumping margin.

It is however known that pumping can occur when the operating speed of the low-pressure compressor CBP and the speed of the high-pressure compressor CHP decrease.

The pumping margin of a low-pressure compressor CBP of a twin bypass turbine engine T depends, among other things, on the flow of air passing through the latter, and on the altitude of the aircraft propelled by this turbine engine. In particular, this pumping margin is lower for an aircraft flying above a certain altitude, for example 25,000 feet (7,620 metres).

Pumping of the low-pressure compressor CBP can occur during the cruise phase of flight at high altitude of an aircraft. In particular, pumping can occur when the turbine engine T undergoes a deceleration controlled by the pilot of the aircraft, or via the auto-throttle mode in turbulent atmosphere conditions and in particular in the case of a more substantial headwind. This deceleration leads to a decrease in the respective operating speeds of the low-pressure compressor CBP and of the high-pressure compressor CHP. However, the low-pressure compressor CBP is linked to the shaft A1 of the low-pressure body, which has more inertia than the shaft A2 of the high-pressure body to which the high-pressure compressor is linked. The speed of the low-pressure compressor CBP decelerates less quickly than that of the high-pressure compressor CHP. This has for consequence an increase in the pressure of the operating line of the low-pressure compressor CBP, all the more so that the high-pressure compressor CHP has variable pitch stator blading which close during deceleration and which thus reduce the cross-section of passage thereof.

If, during this deceleration, the ratio between the pressure measured at a point located upstream of the low-pressure compressor CBP and the pressure measured at a point located downstream of the low-pressure compressor CBP exceeds a certain threshold, a pumping situation can occur in the low-pressure compressor CBP. In this situation, the operating of the turbine engine T can become unstable, consequently damaging the compressor or other components of the turbine engine T.

To protect the turbine engine T and the various elements thereof, protective devices provided with bleed valves VBV (Variable Bleed Valve) are known. As illustrated in FIG. 1 according to an embodiment of the invention, the turbine engine T comprises bleed valves VBV, for example valves or flaps, located between the low-pressure compressor CBP and the high-pressure compressor CHP.

The bleed valves VBV are designed to remove a portion of the primary flow F1 to the secondary flow F2 when they are open. In particular, the opening of the bleed valves VBV allows removing a portion of the primary flow F1 passing between the low-pressure compressor CBP and the high-pressure compressor CHP to the duct V where the secondary flow F2 circulates. The removal of a portion of the primary flow F1 in the duct V where the secondary flow F2 circulates allows protecting the turbine engine T from pumping of the low-pressure compressor CBP when the latter is passed through by a flow of fluid greater than that which can be accepted by the high-pressure compressor CHP.

The closing of the bleed valves VBV maintains all of the primary flow F1 in flow between the low-pressure compressor CBP and the high-pressure compressor CHP.

The bleed valves VBV can be closed, or opened gradually with various possible angles of opening. The closing or the opening of the bleed valves VBV is controlled by an engine computer according to a pre-established control law, or in response to a particular event. For example, such a control law takes account of the controlled speed of the low-pressure compressor CBP, referred to as speed N1, reduced by a temperature measured at a suitable location of the compressor.

According to an embodiment of the invention, the control law also takes account of the data established by a method for detecting conditions conducive to the onset of a pumping.

According to an embodiment of the invention not represented in the figures, the controlling of the bleed valves VBV is implemented to prevent the onset of a pumping phenomenon in the turbine engine T when conditions conducive to the onset of a pumping are detected.

Figure 2:
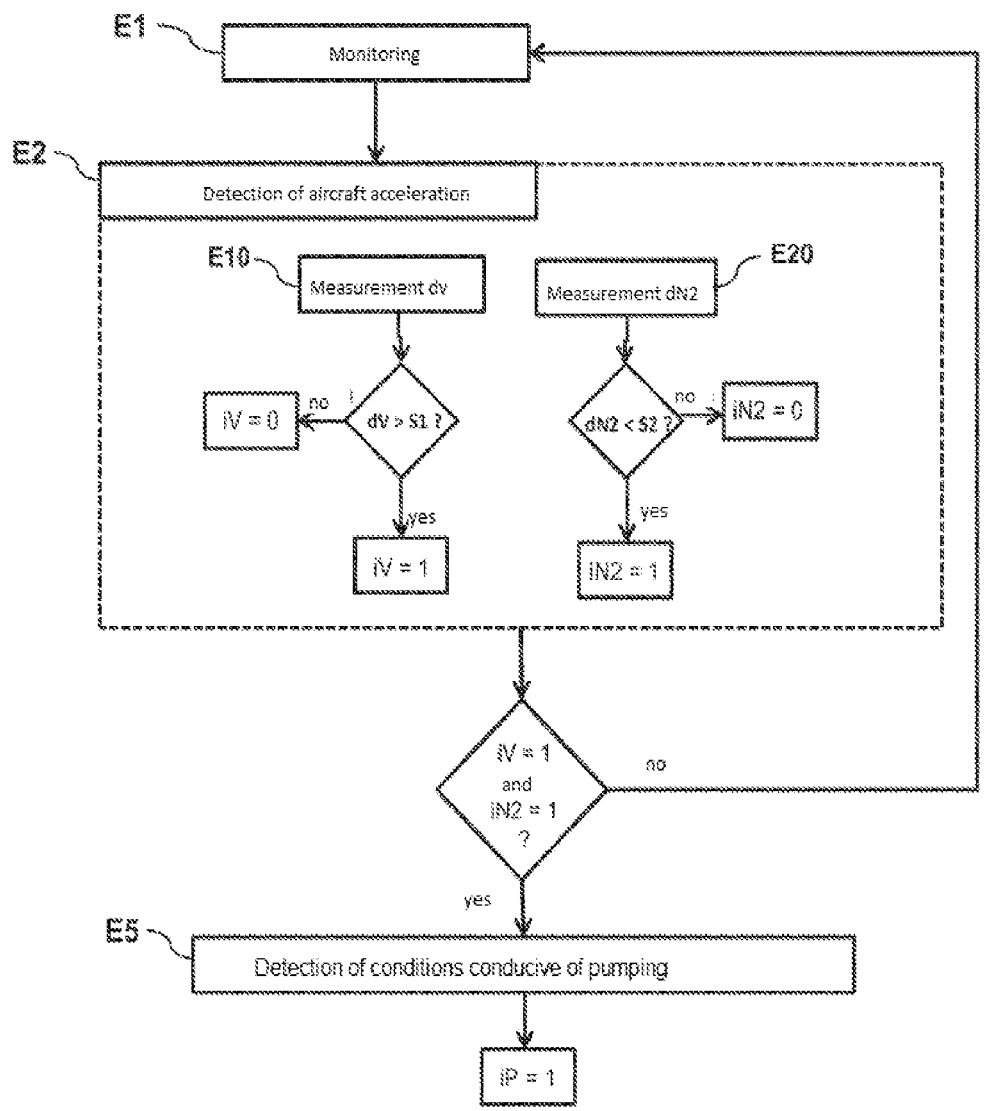
FIG. 2 represents, in the form of a flowchart, the main steps of a method for detecting conditions conducive to the onset of a pumping according to the invention, in an embodiment of the invention.

In reference to FIG. 2, described here are the steps of the method for detecting conditions conducive to the onset of a pumping according to an embodiment of the invention, when said method is implemented by the turbine engine.

Considered here is the case of a pumping that can affect a low-pressure compressor CBP of a twin bypass turbine engine T. It is understood that this assumption is not limiting, and that the invention can also be applied to the high-pressure compressor CHP of a turbine engine T, or to other types of aircraft turbine engines.

The method for detecting comprises a step E1, referred to as monitoring step, during which at least one parameter of the aircraft, a parameter of the turbine engine T, a parameter of the high-pressure compressor CHP or a parameter of the low-pressure compressor CBP is detected.

Furthermore, a step E2 of detecting an acceleration of the aircraft is implemented when the monitoring step E1 is active. The step E2 evaluates indicators of the detection of conditions conducive to the onset of a pumping, said indicators being for example bits positioned to 1 when they are activated, and to 0 otherwise. These indicators are selected from among at least:
one indicator iV that represents a speed variation dV;
one indicator iN2 that represents a speed variation dN2.

According to an embodiment of the invention, the steps E1 and E2 are carried out simultaneously.

On the basis of statistical and experimental studies of aircraft turbine engines flying in a turbulent atmosphere, the inventors were able to determine that the conditions conducive to the onset of a pumping correspond to two relatively concomitant phenomena:
a relatively sudden increase in the speed of the aircraft, and therefore an increase in the Mach number of the aircraft;
a decrease in the operating speed of the high-pressure compressor CHP of the turbine engine.

The speed variation dV is measured over a predetermined time interval, with this time interval being for example equal to 10 seconds, and the speed variation dV corresponds to an acceleration.

According to an embodiment of the invention, said speed variation dV of the aircraft in an increase in the speed of said aircraft. Said speed variation dN2 of the high-pressure compressor CHP is a decrease in the speed of said compressor.

The step E2 of detecting an acceleration of the aircraft comprises a step E10 of measuring a speed variation dV. The step E2 further comprises a step E20 of measuring a speed variation dN2.

Said speed variation dV is an increase in the speed of the aircraft, expressed in Mach per second, and said speed variation dN2 is a decrease in the operating speed of the high-pressure compressor CHP, expressed in revolutions per minute per second.

According to an embodiment of the invention, a measurement of the speed variation dV is taken according to the prior art. This measurement can be taken using probes and/or sensors located on the fuselage of the aircraft, for example on the nose or on the wings. These probes and/or these sensors are configured to measure the flow of air that the aircraft passes through, and comprise for example a Pitot tube configured to measure the dynamic pressure of the air. The dynamic pressure measured is compared to the static pressure and allows determining the speed V of the aircraft.

The step E10 measures the speed V of the aircraft at two successive times, with these two successive times being for example separated by an interval of 10 seconds. In other terms, a first speed V1 is measured at a first time t1, and a second speed V2 is measured at a second time t2, with the second time t2 occurring 10 seconds after the first time t1. The step E10 then determines the speed variation dV by calculating the difference V2−V1.

The step E10 compares the speed variation dV to a predefined threshold, referred to as first threshold S1. If said speed variation dV is greater than said first threshold S1, the indicator iV is activated. The value of the indicator iV is positioned to 1 if a speed variation dV greater than S1 is detected, and to 0 otherwise. Otherwise, the step E10 continues to measure the speed V of the aircraft so as to possibly detect a speed variation dV greater than S1.

The step E20 measures at every instant the speed N2 of the high-pressure compressor CHP of the twin bypass turbine engine T. Said speed N2 can be measured using the rotation speed of the second shaft A2 of the turbine engine T, that mechanically couples the high-pressure compressor CHP to the high-pressure turbine THP. The step E20 then calculates the speed variation dN2, equal to the derivative with respect to the time of N2 at the corresponding measuring instant.

The step E20 then compares the speed variation dN2 with a predefined negative threshold, referred to as second threshold S2. If said speed variation dN2 in algebraic value is less than the second negative threshold S2, in other words if the absolute value of the speed variation dN2 is greater than a predefined positive threshold which is the absolute value of the second threshold S2, the indicator iN2 is activated. The value of the indicator iN2 is positioned to 1 if a speed variation dN2 less than S2 is detected, and to 0 otherwise. Otherwise, the step E20 continues to measure the speed N2 of the high-pressure compressor CHP so as to detect any speed variation dN2 less than S2.

According to an embodiment of the invention, the step E10 can trigger the step E20 when the value of the indicator iV is determined.

The value of the first threshold S1 and the value of the second threshold S2 are selected so as to allow detecting conditions conducive to the onset of a pumping with a minimum risk of false detection. Said values depend on operating characteristics of the turbine engine on which the invention is applied.

The case of an aircraft flying in a cruise phase of flight at high altitude has been considered. During such a flight of the aircraft, it was observed that:
3% of the average flight time of this aircraft takes place in a turbulent atmosphere where the speed variations of the aircraft are greater than 0.01 Mach per 10 seconds;
7% of the average flight time of the aircraft takes place in a moderately turbulent atmosphere, where the speed variations of the aircraft are less than 0.01 Mach for a time interval of 10 seconds and greater than 0.005 Mach for this same time interval;
90% of the average flight time of the aircraft takes place in a calm atmosphere, where the speed variations of the aircraft are less than 0.005 Mach for a time interval equal to 10 seconds.

As pumping is more conducive to occurring in a turbulent atmosphere, the value of the first threshold S1 is thus preferably selected as equal to or close to 0.01 Mach per 10 seconds, i.e. 0.001 Mach per second. The Mach of an aircraft flying in cruise phase of flight at a high altitude can correspond to a speed V between 0.74 and 0.80 Mach, which is a speed comprised between 74% and 80% of the speed of sound.

Furthermore, for an aircraft in a cruise phase of flight at high altitude, the appearance of conditions conducive to the onset of a pumping is necessarily concomitant to a decrease in the operating speed of the high-pressure compressor CHP of the turbine engine, corresponding to a deceleration, in other terms a negative acceleration. This decrease is less than −48 revolutions per minute, i.e. greater in absolute value than 48 revolutions per minute, over a time interval equal to 10 seconds. The value of the second threshold S2 is thus selected more preferably equal to −8 revolutions per minute per second. This value advantageously allows limiting the consequences of an erroneous detection of conditions conducive to the onset of a pumping for a twin bypass turbine engine T allowing the implementation of the invention.

In particular, it is observed that selecting these values of the thresholds S1 and S2 guarantees that in the abovementioned conditions of turbulent atmosphere, a drop in the speed of the high-pressure compressor CHP greater in absolute value than a predefined positive threshold, over a predefined length of time, will most likely lead to pumping of the low-pressure compressor CBP. It has been verified that the method for detecting limits the erroneous detection of conditions conducive to the onset of a pumping during decelerations in the speed of the high-pressure compressor CHP. Based on a statistical study of the flight times of an aircraft provided with twin bypass turbine engines able to be subjected to the abovementioned pumping conditions, the inventors have observed that the erroneous detection of pumping conditions in a calm atmosphere and in a moderately turbulent atmosphere occurred for only about 2.5% of the total flight time of the aircraft.

Successively to the steps E1 and E2, the method for detecting comprises a step E5, referred to as step for detecting conditions conducive to the onset of a pumping, during which the simultaneous activation of the indicators iV and iN2 is examined. If the value of the indicator iV and the values of the indicator iN2 are simultaneously positioned to 1, conditions conducive to the onset of a pumping are detected, and an indicator iP of the risk of pumping is activated. The value of the indicator iP is positioned to 1 in case of the detection of conditions conducive to the onset of a pumping. Otherwise, the method returns to the step E1 of monitoring, and continues to monitor the speed variations dV of the aircraft and the speed variations dN2 of the high-pressure compressor CHP.

When the conditions conducive to the onset of a pumping are detected, i.e. when the indicator iP of the risk of pumping is activated, the method for detecting can have the function of controlling the opening of the bleed valves VBV in order to protect the turbine engine T from pumping.

Figure 3:
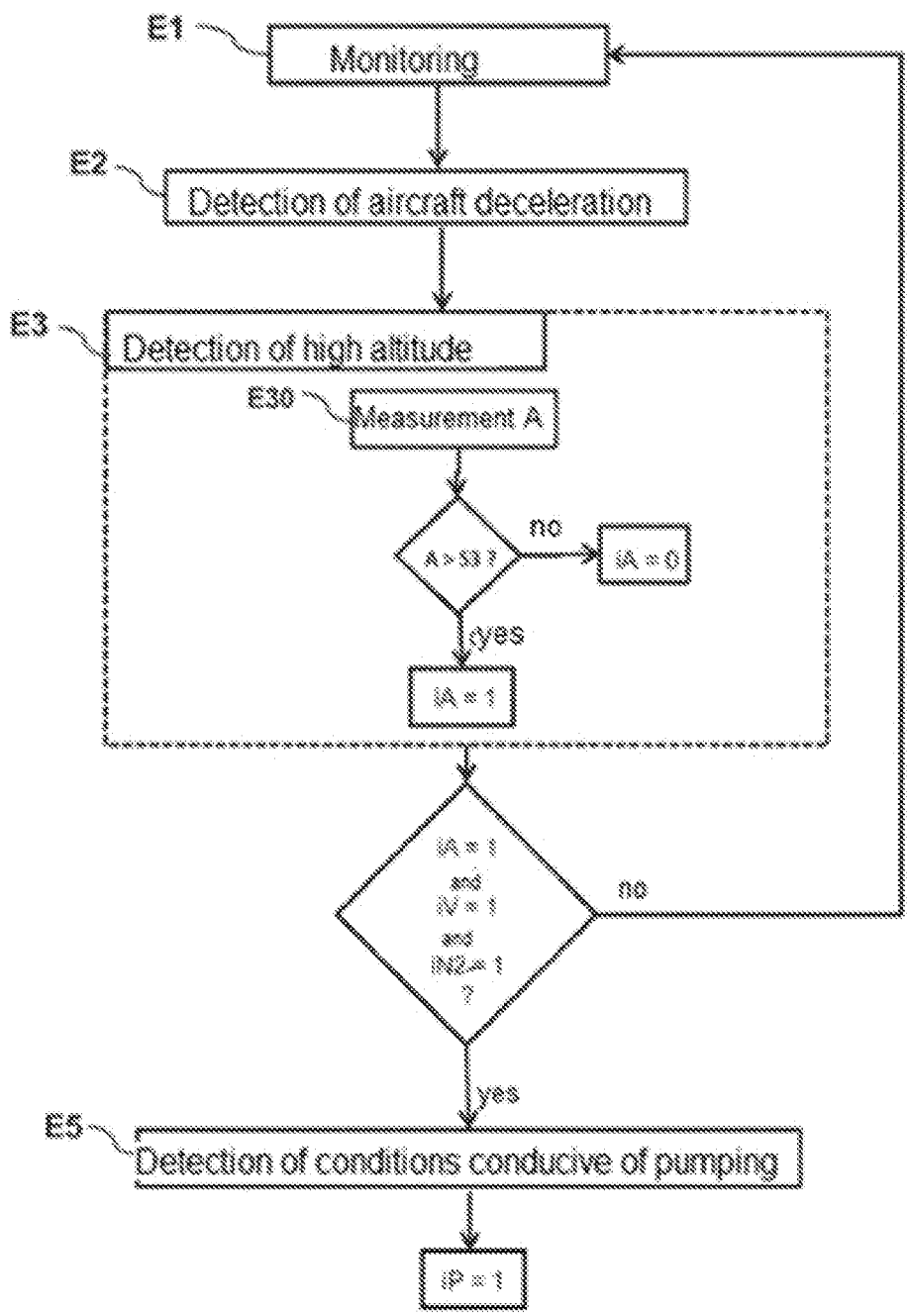
FIG. 3 represents, in the form of a flowchart, the main steps of a method for detecting conditions conducive to the onset of a pumping according to the invention, in another embodiment of the invention
Figure 4:
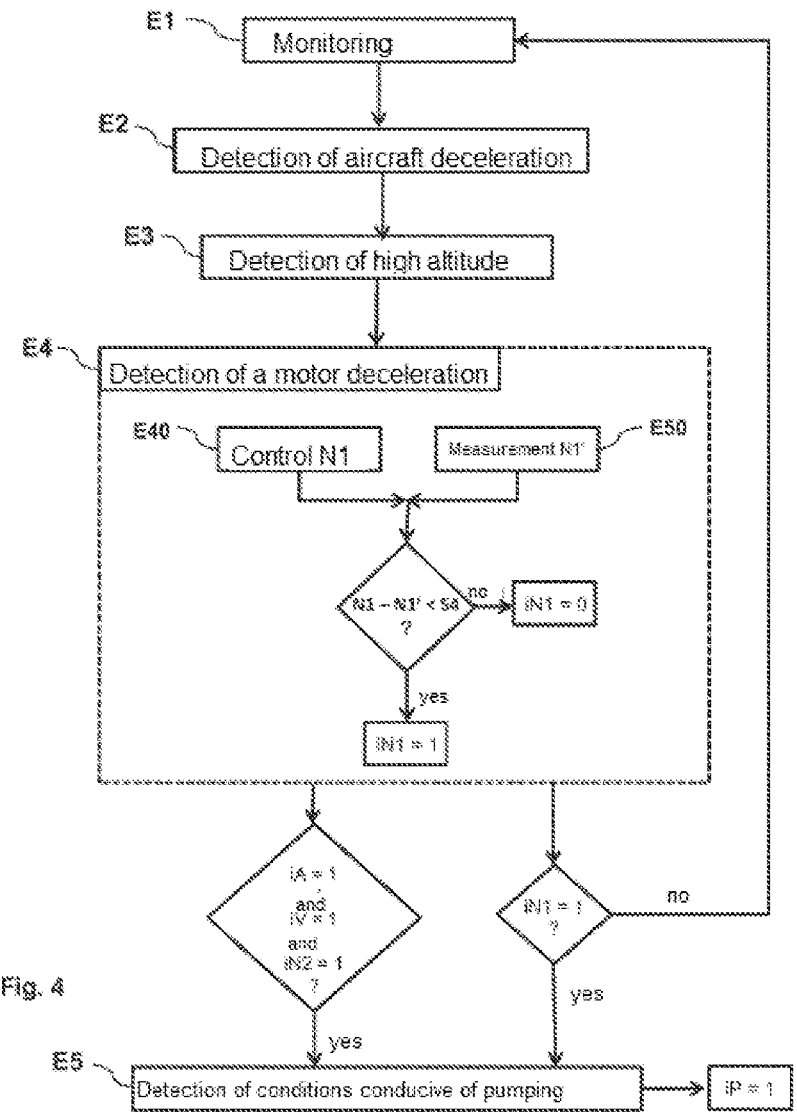
FIG. 4 represents, in the form of a flowchart, the main steps of a method for detecting conditions conducive to the onset of a pumping according to the invention, in another embodiment of the invention
Figure 5:
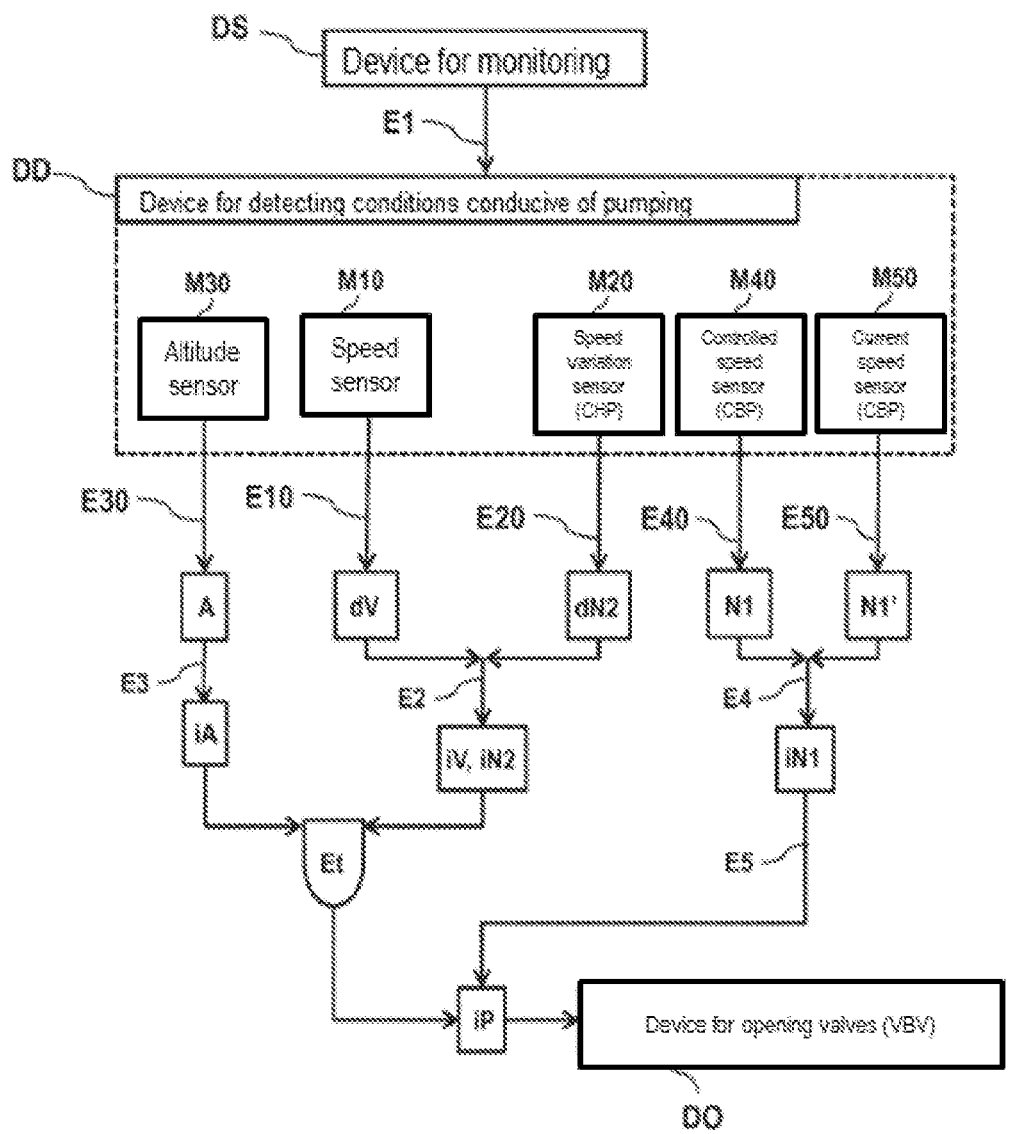
FIG. 5 represents, in the form of a flowchart, an example of means of a device for detecting conditions conducive to the onset of a pumping, in an embodiment of the invention.

As illustrated in FIGS. 3, 4 and 5, indicators other than the indicators iV and iN2 can be used to reinforce the reliability of the detection of conditions conducive to the onset of a pumping.

According to an embodiment of the invention as illustrated in FIG. 3, the method for detecting comprises a step E3, referred to as a step for detecting a high altitude. This step E3 of detecting a high altitude can be implemented substantially simultaneously or successively to the step E2 when the step E1 of monitoring is active.

According to an embodiment of the invention, the step E3 comprises a preliminary step E30 of measuring during which an altitude A of the aircraft is measured. This measurement of an altitude can be carried out using an altimeter located on the fuselage of the aircraft.

The preliminary step E30 compares, at each instant, the altitude A of the aircraft with a predefined threshold, referred to as third threshold S3. If said altitude A of the aircraft is higher than said third threshold S3, the indicator iA is activated. The value of the indicator iA is positioned to 1 if an altitude A higher than S3 is detected, and to 0 otherwise. Otherwise, the preliminary step E30 continues to measure the altitude A of the aircraft so as to detect any altitude greater than S3.

Successively the steps E1, E2 and E3, the step E5 of detecting examines the simultaneous activation of the indicators iA, iV and iN2. If the values of these indicators are simultaneously positioned to 1, the conditions conducive to the onset of a pumping are detected and the indicator iP of the risk of pumping is activated. In particular, the indicator iP is positioned to 1. Otherwise, the method returns to the monitoring step E1, and continues to examine the speed variations of the aircraft, the speed variations of the high-pressure compressor and the altitude of the aircraft.

According to an embodiment of the invention as represented in FIG. 4, the method for detecting can also comprise a step E4, referred to as a step of detecting an engine deceleration. This step E4 of detecting an engine deceleration can be implemented substantially simultaneously or successively to the steps E2 and E3 when the monitoring step E1 is active.

The step E4 of detecting an engine deceleration comprises a step E40 of measuring a first speed N1, referred to as controlled speed of the low-pressure compressor CBP. Furthermore, the step E4 comprises a step E50 of measuring of a second speed N1', referred to as current speed of the low-pressure compressor CBP.

For an aircraft in the cruise phase of flight, it is important to distinguish the controlled speed from the current speed of a turbine engine T. The controlled speed N1 corresponds to the operating speed of the low-pressure compressor CBP required by the pilots of the aircraft when they are controlling the turbine engine T, each one using a gas throttle. The current speed N1' corresponds to the actual operating speed of the low-pressure compressor CBP.

Because there is always a response time between the speed controlled by the gas throttle and the current speed of the low-pressure compressor CBP, the speeds N1 and N1' are not always equal.

Based on the measurement of the controlled speed N1 and on the measurement of the current speed N1', the step E4 then measures the difference between these two values at every instant. The difference between N1 and N1', equal to N1−N1', is then compared to a predefined threshold, referred to as the fourth threshold S4. If the difference N1−N1' is less than said fourth threshold S4, the indicator iN1 is activated. The value of the indicator iN1 is positioned to 1 is a difference in speed less than S4 is detected, and to 0 otherwise. Otherwise, the steps E40 and E50 continue to monitor the controlled speed N1 and the current speed N1' so as to detect any difference in the speed less than S4.

In auto-throttle mode, and as the controlled deceleration is slow at high altitude in case of a sudden increase in the Mach, the difference between the current speed N1' and the controlled speed N1 can be less than the detection threshold S4 all throughout a deceleration, which results in not detecting it, hence the necessity of setting up a second logic.

Successively to the steps E1, E2, E3 and E4, the detection step E5 examines the activation of the indicators iA, iV and iN2. If the values of these indicators are simultaneously positioned to 1, the conditions conducive to the onset of a pumping are detected and the indicator iP of the risk of pumping is activated. In particular, the indicator iP is positioned to 1. Otherwise, the method examines the activation of the indicator iN1. If the indicator iN1 is positioned to 1, conditions conducive to the onset of a pumping are detected. Otherwise, the method returns to the implementation of the monitoring step E1, and continues to monitor the speed variations of the aircraft, the speed variations of the high-pressure compressor CHP, the altitude of the aircraft, and the speed variations of the low-pressure compressor CBP.

The value of the fourth threshold S4 is selected so as to allow detecting conditions conducive to the onset of a pumping when the aircraft is flying in auto-throttle mode.

As the controlled speed N1' remains constant in auto-throttle mode, conditions conducive to the onset of a pumping can be detected when the difference between N1 and N1' becomes less than −1,000 revolutions per minute over a time interval of 10 seconds. The value of the fourth threshold S4 is thus selected preferably equal to −100 revolutions per minute per second.

According to this embodiment, it is possible to detect a pumping from the detection of a decrease in speed V of the aircraft, a variation dN2 in the operating speed of the high-pressure compressor CHP, a detecting of a high altitude A of the aircraft and a detecting of a difference between the controlled speed N1 and current speed N1' of the low-pressure compressor CBP. When the steps E1, E2, E3, and E4 are implemented, a reliable and precise detection of conditions conducive to the onset of a pumping that can affect a twin bypass turbine engine T can be carried out at high altitude and at low altitude.

According to another embodiment of the invention not represented in the figures, these steps can be implemented for several turbine engines. Furthermore, these steps can be implemented for different turbine engines.

In reference to FIG. 5, the invention also aims for a device DD for detecting conditions conducive to the onset of a pumping, this pumping being able to affect a low-pressure compressor CBP of a turbine engine, this turbine engine further comprising a high-pressure compressor CHP.

The device DD for detecting conditions conducive to the onset of a pumping is activated by the step E1 of monitoring by a device for monitoring DS. Furthermore, the device DD for detecting conditions conducive to the onset of a pumping controls a device DO for opening bleed valves VBV.

According to an embodiment of the invention, the device DD comprises:
- first measuring means M10, including for example a speed sensor, configured to measure a speed V and to calculate a speed variation dV of said aircraft during the step E20,
- second measuring means M20, including for example a speed variation detector, and configured to measure a speed variation dN2 of the high-pressure compressor CHP during the step E20.

The device DD also comprises means for implementing the step E2 and thus activating the indicators iV and iN2 using the comparison of the speed variation dV and of the speed variation dN2 of the high-pressure compressor CHP with the first threshold S1 and with the second threshold S2, respectively.

The device DD further comprises:
- third measuring means M30, including for example an altitude sensor such as an altimeter, configured to measure an altitude A of the aircraft during the preliminary step E30;
- fourth measuring means M40, including for example a system for controlling the aircraft, configured to measure a controlled speed N1 of the low-pressure compressor CBP during the step E40;
- fifth measuring means M50, including for example a speed sensor able to measure the rotation speed of the shaft A1, configured to measure a current speed N1' of the low-pressure compressor CBP during the step E50.

The device DD further comprises means for implementing the step E3 and activating the indicator iA using the comparison of the altitude A with a third threshold S3.

When conditions conducive to the onset of a pumping are detected, i.e. when the indicator iP of the risk of pumping is activated, the device DO for opening bleed valves VBV is controlled in order to open said bleed valves. A detection method and device according to one or the other embodiment of the invention allows carrying out the opening of the bleed valves VBV during the detection of conditions conducive to the onset of a pumping.

Figure 6:
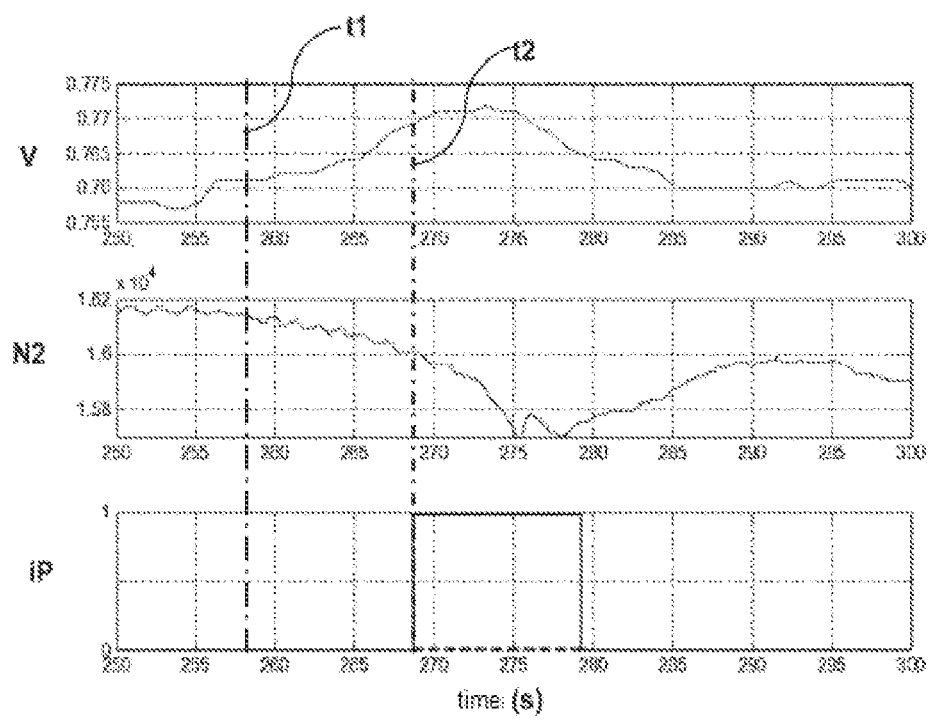
FIG. 6 represents, in the form of a graph, an example that represents the variation in several parameters that represent conditions conducive to the onset of a pumping that can affect a turbine engine on which the invention can be applied.

FIG. 6 represents a graph that illustrates an example in the variation of several parameters when pumping appears in a turbine engine. These parameters are here the speed V of the aircraft, more particularly the Mach thereof, the operating speed N2 of the high-pressure compressor CHP, and an indicator iP that represents the detection of conditions conducive to the onset of a pumping when a method according to an embodiment of the invention is implemented.

The variations of the three parameters V, N2 and iP are represented over a time interval of between 250 seconds and 300 seconds. The speed V of the aircraft and the operating speed N2 of the high-pressure compressor CHP are measured over this same interval.

The speed V of the aircraft increases from 0.755 Mach to 0.77 Mach between 250 seconds and 275 seconds, then decreases from 0.77 Mach to 0.76 Mach from 275 seconds to 300 seconds. The operating speed N2 decreases from 1,620 revolutions per minute to 1,580 revolutions per minute between 250 seconds and 275 seconds, then increases from 1,580 revolutions per minute to 1,590 revolutions per minute between 275 seconds and 300 seconds.

As illustrated, the invention allows detecting conditions conducive to the onset of a pumping between the time t1 of 258 seconds and the time t2 of 268 seconds. Indeed, a speed V equal to 0.76 Mach is measured at the time t1. At the time t2, a speed V equal to 0.77 Mach is measured. The difference in speed dV observed in the interval of 10 seconds between the time t1 and the time t2 is therefore equal to 0.01 Mach. The indicator iV is activated in this case, signalling an increase in speed dV greater than the first threshold S1, with this first threshold being fixed in this example to 0.009 Mach over a duration of 10 seconds, which is an acceleration threshold of 0.0009 Mach per second. Furthermore, a speed N2 equal to 16,150 revolutions per minute is measured at the time t1, and a speed N2 equal to 16,000 revolutions per minute is measured at the time t2. The difference in speed dN2 in the interval of 10 seconds between the time t1 and the time t2 is equal to −150 revolutions per minute, i.e. equal to −15 revolutions per minute per second, and is therefore less than −8 revolutions per minute per second. The indicator iN2 is activated in this case, signalling a decrease in the operating speed of the high-pressure compressor CHP less than the threshold S2.

The indicator iV and the indicator iN2 being positioned to 1 between the time t1 and the time t2, the indicator iP that represents the detection of conditions conducive to the onset of a pumping is also activated over this interval.

It is understood that a method for detecting conditions conducive to the onset of a pumping according to one of the embodiments of the invention described here, as well as a device for detecting pumping according to this embodiment, is implemented in a turbine engine. In particular, the turbine engine can be a twin bypass turbine engine T, comprising the device DD for detecting conditions conducive to the onset of a pumping.

According to an embodiment of the invention, the device DD for detecting conditions conducive to the onset of a pumping is implemented using software implemented in an electronic unit for controlling the turbine engine, embedded in the turbine engine, called ECU (Engine Control Unit) or also FADEC (Full Authority Digital Engine Control). In particular, this software comprises instructions adapted to the implementation of any step of the method described above.

The invention claimed is:

1. A method for detecting conditions conducive to an onset of pumping affecting a low-pressure compressor of a turbine engine for an aircraft, said turbine engine further comprising a high-pressure compressor, the method comprising:
measuring a speed variation of said aircraft;
measuring a speed variation of said high-pressure compressor;
measuring an altitude of said aircraft;
determining the conditions conducive to the onset of pumping when (a) said speed variation of said aircraft measured over a predetermined time interval corresponds to an acceleration greater than a first positive threshold, (b) said speed variation of said high-pressure compressor corresponds to a deceleration less than a second negative threshold; and (c) said measured altitude is higher than a predetermined third threshold.

2. The method according to claim 1, wherein said first threshold is between $10^{-4}$ Mach per second and $10^{-2}$ Mach per second.

3. The method according to claim 2, wherein said first threshold is equal to 0.001 Mach per second.

4. The method according to claim 1, wherein said time interval is between 3 seconds and 20 seconds.

5. The method according to claim 4, wherein said time interval is equal to 10 seconds.

6. The method according to claim 1, wherein said second threshold is between −2 revolutions per minute per second and −20 revolutions per minute per second.

7. The method according to claim 6, wherein said second threshold is equal to −8 revolutions per minute per second.

8. The method according to claim 1, wherein said third threshold is between 20,000 feet (6096 metres) and 30,000 feet (9,144 metres).

9. The method according to claim 8, wherein said third threshold is equal to 25,000 feet (7,620 metres).

10. The method according to claim 1, the method further including:
measuring a first controlled speed of the low-pressure compressor;
measuring a second current speed of the low-pressure compressor;
determining the onset of pumping has occurred independent of other factors when
a difference between said first measured controlled speed and said second measured current speed is less than fourth threshold.

11. The method according to claim 10, wherein, when the measured altitude is less than the third threshold, the first and second measuring steps are ignored and the conditions conducive to the onset of pumping are detected when the difference between said first measured controlled speed and said second measured current speed is less than fourth threshold.

12. The method according to claim 1, wherein detecting conditions conducive to the onset of pumping triggers a command to open bleed valves located between the low-pressure compressor and the high-pressure compressor.

13. The method according to claim 1, wherein said speed variation of said high-pressure compressor is measured by calculating a derivative of the speed and filtering the derivative with a time constant adapted to average a speed measurement over a time interval between 1 second and 3 seconds.

14. A device for detecting conditions conducive to an onset of a pumping affecting a low-pressure compressor of a turbine engine for an aircraft, said turbine engine further comprising a high-pressure compressor, wherein said device comprises:
means for measuring a speed variation of said aircraft;
means for measuring a speed variation of said high-pressure compressor;
means for measuring an altitude of said aircraft;
means for determining the conditions conducive to the onset of pumping when (a) said speed variation of said aircraft measured over a predetermined time interval corresponds to an acceleration greater than a first positive threshold, (b) said speed variation of said high-pressure compressor corresponds to a deceleration less than a second negative threshold; and (c) said measured altitude is higher than a predetermined third threshold.

15. The device according to claim 14, wherein said first threshold is between $10^{-4}$ Mach per second and $10^{-2}$ Mach per second.

16. The device according to claim 14, wherein said time interval is comprised between 3 seconds and 20 seconds.

17. The device according to claim 14, wherein said second threshold is between −2 revolutions per minute per second and −20 revolutions per minute per second.

18. The device according to claim 14, wherein said third threshold is between 20,000 feet (6,096 metres) and 30,000 feet (9,144 metres).

19. The device according to claim 14, wherein said device further comprises:
means for measuring a first controlled speed of the low-pressure compressor;
means for measuring a second current speed of the low-pressure compressor;
means for determining the onset of pumping has occurred independent of other factors when a difference between said first measured controlled speed and said second measured current speed is less than fourth threshold.

20. A turbine engine comprising the device according to claim 14.

21. The device according to claim 14, wherein said means for measuring a speed variation of said aircraft are probes and/or sensors configured to measure a flow of air that the aircraft passes through and determine said speed variation of said aircraft therefrom.

22. The device according to claim 14, wherein said device is implemented in an electronic unit for controlling said turbine engine.

* * * * *